July 1, 1941. H. A. TEPEL 2,247,671
CABLE SEAL
Filed Sept. 14, 1938 3 Sheets-Sheet 1
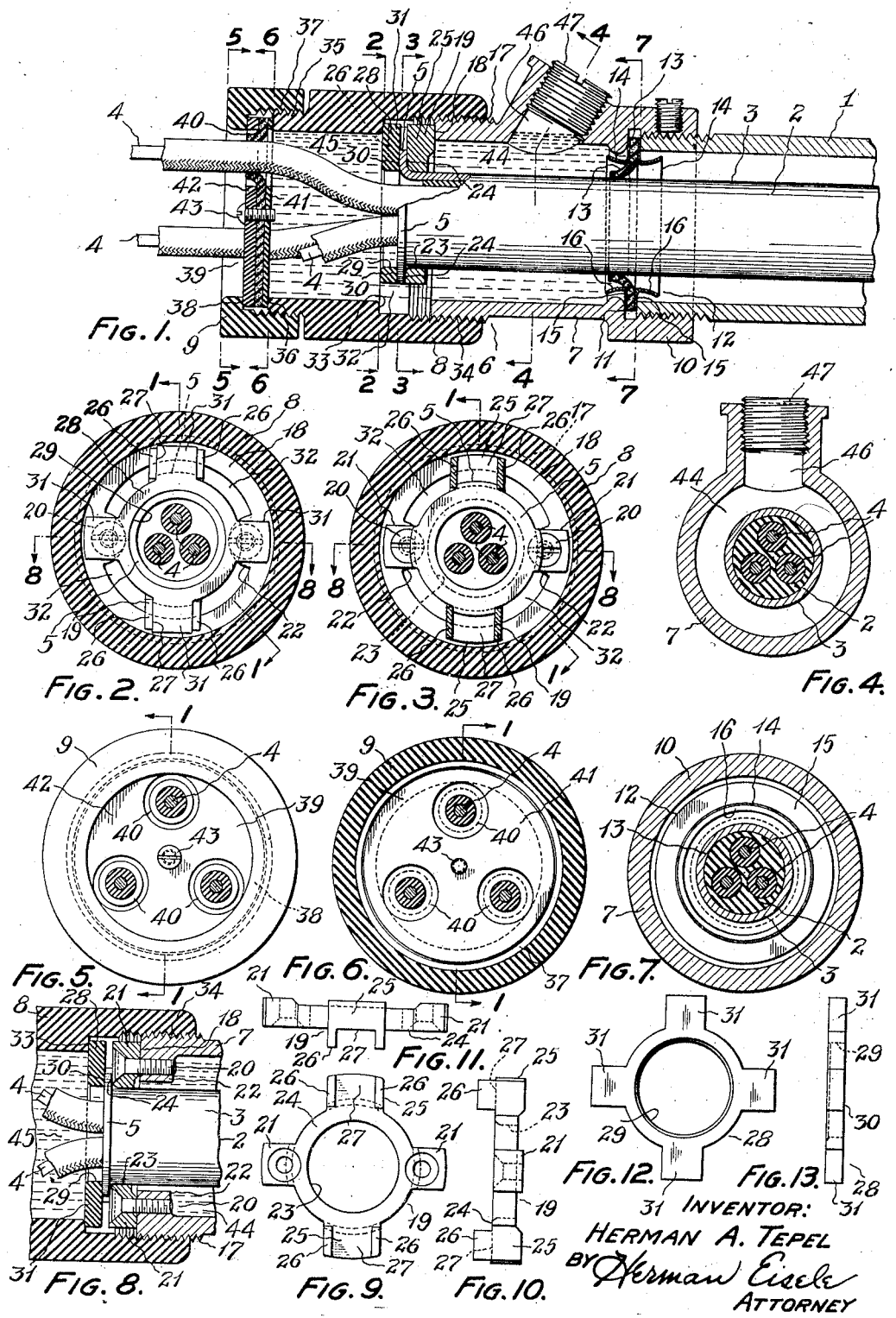
INVENTOR:
HERMAN A. TEPEL
BY Herman Eisele
ATTORNEY July 1, 1941.  H. A. TEPEL  2,247,671
CABLE SEAL
Filed Sept. 14, 1938  3 Sheets-Sheet 2
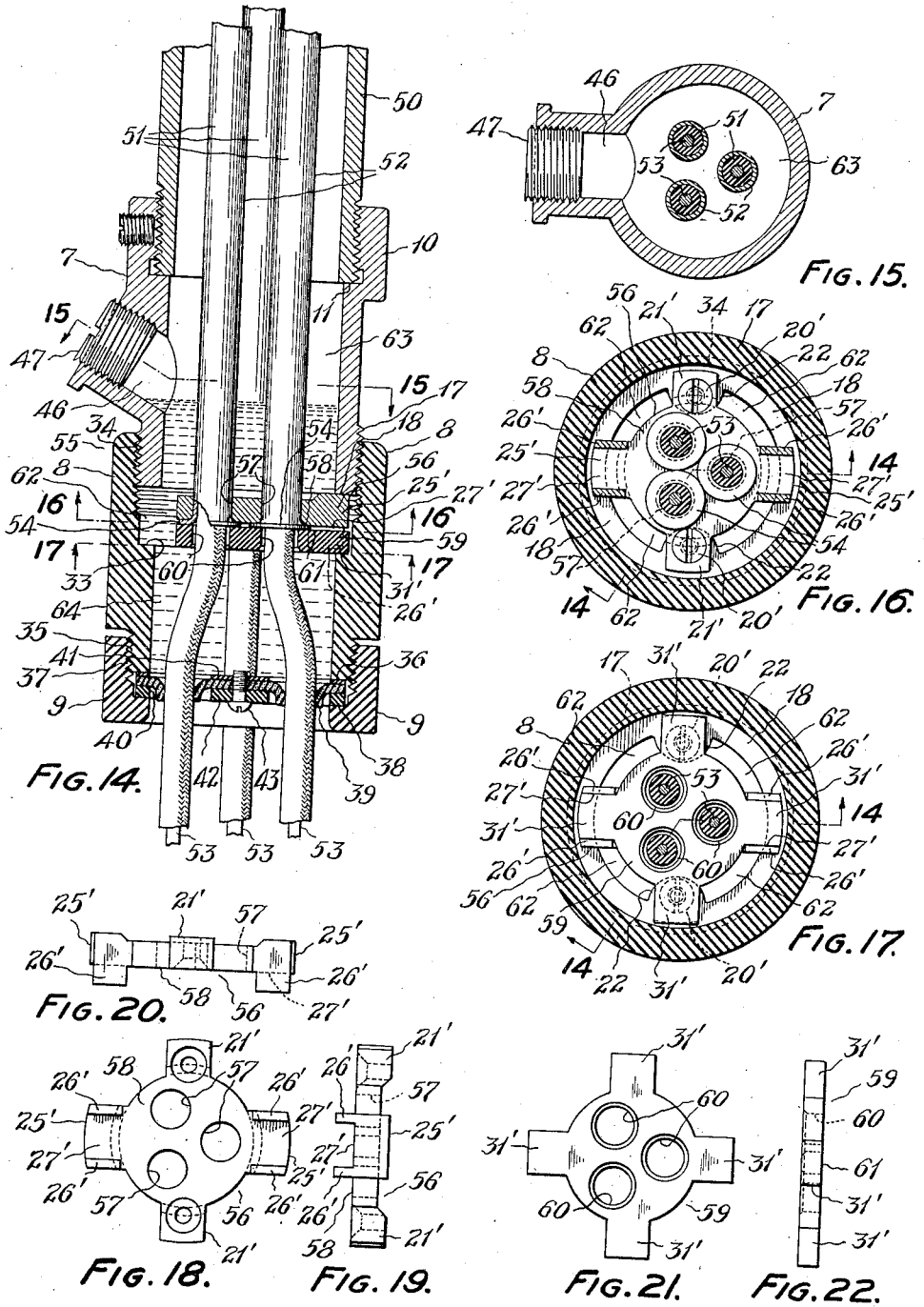
INVENTOR:
HERMAN A. TEPEL
BY Herman Eisele
ATTORNEY

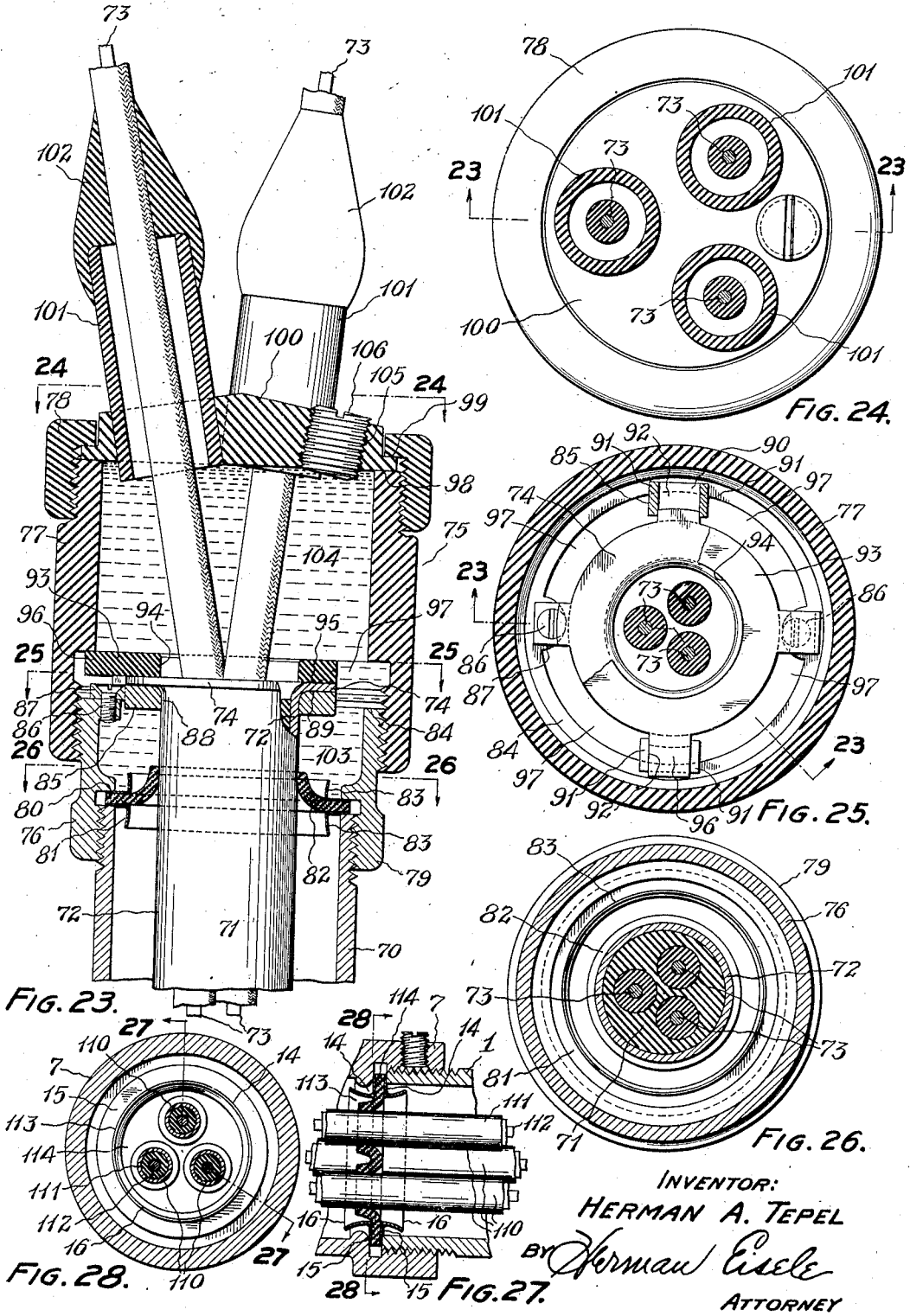

Patented July 1, 1941

2,247,671

UNITED STATES PATENT OFFICE 2,247,671

CABLE SEAL

Herman A. Tepel, Cleveland Heights, Ohio, assignor of one-half to John C. Boyton, Cleveland, Ohio Application September 14, 1938, Serial No. 229,803

8 Claims. (Cl. 174—76)

This invention relates to cable seals, also known as potheads, cable end bells or terminators, used for sealing the ends of electric cables sheathed with lead or other suitable covering, carrying one or more electrical conductors. As is well known, these cable seals are provided to prevent moisture entering the cable at the termination of the sheath, where the individual conductors are brought out of the sheath for the purpose of making connections to the lines or to the equipment to which the electrical current is to be carried.

More particularly, this invention relates to devices of this class which are applied to the ends of conduits carrying the sheathed cable and to devices which are formed with a chamber adapted to receive a sealing and insulating compound.

It is an object of this invention to produce a cable seal of this class which is simple in construction, easy to assemble, efficient in performing its required functions, and characterized by certain distinctly novel and advantageous features not inherent in devices of this type heretofore developed.

It is accordingly an important object of this invention to produce a cable seal which provides for the imbedding of a substantial portion of the lead sheath as well as the conductors in the sealing compound, in order that both the sheath and the conductors may be effectively sealed and anchored relatively to the conduit.

It is a further object of this invention to produce a cable seal in which two spaced communicating chambers are provided one for enclosing the lead sheath and the other for enclosing the conductors emerging from the lead sheath, and in which both chambers can be simultaneously filled with sealing and insulating compound through one filling opening.

It is a further object of this invention to produce a cable seal in which means for clamping the flanged end of the sheath or axially fixing the sheath of the cable are provided interiorly of the chamber in the seal and in which these clamping means are completely imbedded in the sealing compound.

It is a further object of this invention to provide a cable seal in which the flange engaging means of the sheath clamping device are positively rotatably fixed with reference to the conduit and the sheath.

It is a further object of this invention to produce a cable seal in which the housing is formed of several component parts and in which a substantial portion of the housing can be removed without destroying the sealing compound.

It is a further object of this invention to provide a cable seal which can be installed with minor modifications at any convenient or necessary angle including horizontal, inverted or upright positions.

It is a further object of this invention to provide a cable seal which can readily be adapted for sealing one or a plurality of sheathed cables enclosed by a conduit and one or a plurality of conductors encased in each of the sheaths, all by the substitution of different partitions or diaphrams.

It is a further object of this invention to produce a cable seal housing provided with improved end closure means for permitting the passage of the cable and conductors and at the same time effectively preventing the loss of sealing compound.

Further objects and advantages of this invention will appear from the following description and from reference to the accompanying drawings. These annexed drawings and description set forth in detail certain means embodying this invention, such disclosed means constituting however, but a few of the forms in which the principles of this invention may be applied.

In said annexed drawings:

Fig. 1 is a vertical axial section through one adaptation of this invention, this view showing the device sealing a single lead sheathed cable and three conductors, projecting from the end of a conduit in a horizontal direction, this cable seal being installed in what may be termed a horizontal position, this view being taken on several planes indicated by the lines 1, 1 in Figures 2, 3, 5, and 6.

Fig. 2 is a transverse section through this adaptation taken on the plane indicated by line 2, 2, in Fig. 1, showing certain sheath clamping elements.

Fig. 3 is a section taken through the sheath clamping elements, this view being taken on the plane indicated by line 3, 3 in Fig. 1.

Fig. 4 is a transverse section taken through the filling opening, this view being taken on the plane indicated by line 4, 4, in Fig. 1.

Fig. 5 is an outer end elevation of the cable seal, this view being taken from the plane indicated by line 5, 5, in Fig. 1.

Fig. 6 is a transverse section through the cable seal showing the outer end closure, this view being taken on the plane indicated by the line 6, 6 in Fig. 1.

Fig. 7 is a transverse section through the cable seal showing an inner closure member, this view being taken on the plane indicated by line 7, 7 in Fig. 1.

Fig. 8 is a fragmentary horizontal axial section, this view being taken on the plane indicated by line 8, 8 in Figures 2 and 3.

Figures 9, 10 and 11 are, respectively, detached end elevation, side view and plan view of one of the elements adapted to clamp the cable sheath shown in Figures 1, 2, and 3.

Figures 12 and 13 are respectively, detached end elevation and side elevation of a second element cooperating with the element shown in Figures 9 to 11 for clamping the sheath.

Figure 14 is a vertical axial section through a second adaptation of this invention, this view showing the device sealing three lead sheathed cables and three conductors, projecting from these cables in a downwardly direction, the cable seal being mounted in what may be termed an inverted position, this view being taken on the several planes indicated by the lines 14, 14 in Figures 16 and 17.

Fig. 15 is a transverse plan section taken upon the plane indicated by the lines 15, 15 in Fig. 14.

Fig. 16 is a transverse plan section through the sheath clamping elements, this view being taken on the plane indicated by line 16, 16 in Fig. 14.

Fig. 17 is an additional transverse section showing the sheath clamping elements, this view being taken on the plane indicated by line 17, 17 in Fig. 14.

Figures 18 and 19 and 20 are, respectively, detached end elevation, side elevation and plan view of one of the sheath clamping elements shown in Figures 14, 16 and 17.

Figures 21 and 22 are, respectively, detached end elevation and side elevation of a second sheath clamping element cooperating with the element shown in Figures 18, 19 and 20.

Fig. 23 is a vertical axial section of a third adaptation of this invention, this view showing the device sealing a single lead sheathed cable and three conductors, projecting from the end of a conduit in a vertically upward direction, this cable seal being mounted in what may be termed the upright position, this view being taken on the several planes indicated by the line 23, 23 in Figures 24 and 25.

Fig. 24 is a top plan view of the cable seal shown in Fig. 23, this view being taken from the plane indicated by line 24, 24 in Fig. 23.

Fig. 25 is a plan section showing the sheath clamping elements, this view being taken on the planes indicated by line 25, 25 in Fig. 23.

Fig. 26 is a transverse section showing the inner sheath sealing diaphram, this view being taken on the plane indicated by line 26, 26 in Fig. 23.

Fig. 27 is a fragmentary vertical axial sectional view, similar to a portion of Fig. 1, illustrating the type of sealing partition used at the end of the conduit when the cable seal is used in the horizontal position and when a plurality of sheathed cables or conductors are carried in the conduit, this view being taken on the plane indicated by lines 27, 27 in Fig. 28.

Fig. 28 is a transverse sectional view of the construction shown in Fig. 27, and taken on the plane indicated by line 28, 28 in that figure.

In the following specifications and claims the term "inner" used in reference to the cable seal or its component parts is intended to indicate a location at or a direction toward the end of the conduit to which the cable seal is attached and conversely the term "outer" is intended to indicate a location spaced from or a direction away from the conduit.

Referring first to the adaptation of this invention for use in a horizontal position, illustrated in Figures 1 to 13 inclusive, the conduit to which this cable seal is applied is indicated at 1. This conduit carries electric cable means including a sheathed cable unit or sheathed conductor indicated at 2, comprising a sheath 3 made of lead or other suitable material, and in the embodiment illustrated, the cable unit includes three conductors 4, each covered by suitable insulation. As will appear, the sheath projects a substantial distance beyond the end of the conduit and the conductors extend outwardly beyond the end of the sheath for an indefinite distance sufficient to connect with the apparatus to which the electrical current is intended to be carried.

The sheath at its outer end is formed with an outwardly deflected flange indicated at 5, which is preferably formed after the cable is properly located axially in the cable seal and which is firmly clamped by suitable elements to be hereinafter described.

The cable seal is preferably mounted upon the end of the conduit and is made in the form of a housing indicated generally at 6 and consists preferably of three separate body forming elements, the inner casing or coupling member 7, preferably formed of metal, an extension or intermediate casing member 8, preferably made of insulating material, and an outer end or ring bushing member 9, also preferably made of insulating material.

The inner casing member 7 is formed with an interiorly threaded cylindrical extension or hub 10 at its inner end adapted to be screwed upon the threaded end of the conduit, as clearly shown in Fig. 1, and a set screw may be provided to fix or lock the casing in position on the conduit. Adjacent the threaded portion and juxtaposed to the end of the pipe, the casing 7 is formed with an annular shoulder or abutment 11. Interposed between the end of the conduit and the abutment 11 is a metal clad sealing washer or partition indicated generally at 12 and formed of an elastic and relatively soft rubber diaphram 13 mounted between two relatively thin annular sheet metal rings 14, each having a flat portion 15 cemented or otherwise suitably secured to the face of the rubber diaphram and formed with an opening bounded by an axially extending and radially outwardly belled flange or pilot 16 simulating a funnel, the diameter of the opening being sufficiently large to accommodate the largest cable intended to be carried by the conduit. The rubber diaphram is formed with an opening whose free or unextended diameter is considerably smaller than the outside diameter of the lead sheath 3 of the cable, and accordingly when the sheathed cable is inserted in the opening, the rubber snugly embraces the lead sheath in a substantially liquid tight manner. The belled flange or pilot 16, as will be clear, is provided to prevent injury to the surface of the conductors or sheath, when the cable is passed through the rings 14.

The outer end of the inner casing 7 is formed with a cylindrical portion provided with an external thread as indicated at 17 and terminates in a substantially smooth outer face 18. Engaging the outer face 18 is a spider 19 preferably secured to the inner casing 7 by means of a plurality of countersunk screws indicated at 20, 20 passing through ears 21, 21, formed on diametrically opposed sides of the spider 19 and engaging suitably tapped holes in bosses 22 formed in the inner casing as indicated in Figures 2 and 3. This spider 19 is formed with an opening 23 of substantially the same size as the outside diameter of the sheath 3 of the cable to be sealed. In assembling the cable seal and sheath, the outer end of the sheath 3 is drawn outwardly a sufficient distance to provide ample material to permit the formation of the flange 5. This flange is then formed by flaring the end of the sheath outwardly by means of suitable tools until the flange engages the annular outer surface 24 on the spider 19.

The spider 19 is preferably made of brass, aluminum, or other suitable material adapted to ground the lead sheath of the cable through the metallic inner casing 7.

The spider 19 is further formed with a pair of laterally extending ears 25, 25, each shaped with a pair of longitudinally extending flanges or shoulders 26 providing a pair of channels or recesses 27, these channels being preferably located on diametrically opposite sides of the spider and right angularly disposed with reference to the pair of ears 21. The flanges 26, as will appear from the drawings, project outwardly a distance substantially greater than the thickness of the flange 5.

Engaging the outer surface of the flange 5 is a second spider 28 formed with an opening 29 of substantially the same size as the opening 23 and formed with an annular inner surface 30 juxtaposed to the surface 24 and in engagement with the outer face of the flange 5. The size of the opening 29 need not be greater than sufficient to permit the conductors to pass therethrough as will appear from an inspection of Figures 1 and 2.

The spider 28 is formed with a plurality of radially projecting and diametrically opposed ears 31, at least two of which are alined with and are of a width slightly less than the width of the channels 27 on the spider 19. The spider 28 is thus adapted to be nested in and centered by the recesses 27 on the ears 25 on the spider 19. It will be apparent that the spider 28 is longitudinally movable but is locked against rotation with reference to the spider 19.

This spider 28 is preferably made of insulating material, the thickness of the ears of the spider being preferably substantially the same as the outwardly projecting height of the ears 26, for reasons which will appear.

The radial width of the annular surfaces 24 and 30 is substantially the same as the width of the flange 5, these widths being so determined that the clamping engagement between the spiders and the flange will be able to effectively fix or anchor the sheath in the housing, both axially and radially. In practice it is preferred to so dimension the parts of the cable seal that an annular space is formed between the outside diameter of the flange 5 and the inside dimensions of the casings 7 and 8. This provision results in the formation of registering longitudinal passages or ports formed between the sheath and the inside wall of the casings in the planes of the spiders 19 and 28. These ports through the spiders are indicated at 32 in Figures 1, 2 and 3, and assume proximate sector shapes, being defined radially by the outside diameter of the surfaces 24 and 30 and the inside diameter of the casings and being defined circumferentially by the ears 21 and 25 in the case of the spider 19 and by the ears 31, 31 in the case of the spider 28.

The outer face of the ears 31 is engaged by an annular shoulder or abutment 33 formed on the extension casing 8. The inner end of this extension casing is also formed with an internal thread 34 adapted to engage the external thread 17 on the inner casing 7. As will appear, the advance of the extension casing 8 as it is threaded upon the casing 7 will cause the abutment 33 to force the spider 28 toward the spider 19 and will thus firmly hold the flange 5 between the surfaces 30 and 24 on the spiders.

It will appear that the thickness of the flange 5 plus the thickness of the ears 31 of the spider 28 must be greater than the outward projection of the flanges 26 in order that intimate clamping contact between the flange 5 and the spiders may be effected and for this reason the thickness of the ears 31 is preferably made equal to the height of the flanges 26. It will also be apparent that no tendency whatsover will exist to rotate or twist the sheath 3 or the flange 5 during this clamping operation due to the fact that both spiders are prevented from rotating relatively to the casing 7 and the conduit 1, due to the fact that the spider 19 is fixedly secured to the casing 7 and the spider 28 is locked against rotation in the channels 27 of the spider 19.

The outer end of the extension casing is formed with an external thread indicated at 35 and terminates in a substantially smooth outer face 36. Engaging the thread 35 is an internally threaded portion 37 of the ring bushing member 9. This bushing member is additionally formed with an inwardly directed annular shoulder or abutment 38. Interposed between the outer face 36 and the inwardly directed abutment 38 is a composite sealing diaphram or closure member indicated generally at 39 and formed of a resilient soft rubber diaphram 40 interposed between two annular discs 41 and 42 preferably formed of insulating material and preferably removably secured together by means of a screw 43. The discs 41 and 42 are formed with apertures sufficient in number and size to permit the ready passage therethrough of the conductors projecting outwardly from the end of the sheath on the cable. The rubber diaphram 38 is similarly formed with apertures, the apertures in this diaphram however being considerably smaller in area than the cross sectional area of the respective conductors, and accordingly when the conductors are inserted in the aperture, the rubber snugly but yieldingly embraces the sheath in substantially liquid tight manner.

It will appear from the construction shown and described that a chamber is formed within the housing of the device, this chamber being sealed at its inner end against the conduit by the sheath embracing partition 12 and exteriorly sealed at its other end by the conductor embracing closure member 39. This chamber, in fact, consists of two axially alined spaced chambers, an inner chamber 44 formed around the sheath 3 of the cable extending outwardly from the conduit, and an outer chamber 45 formed around that portion of the conductors 4 extending outwardly from the end of the sheath which are disposed within the housing. The ports 32 at the flange clamping spiders form communicating passages between the chamber 44 and 45.

In order to effectively seal and insulate the sheath and conductors, a sealing compound is introduced into the chambers 44 and 45 for which purpose a filling opening 46 is provided in the casing 7 adapted to be closed by a threaded plug 47, the sealing compound readily passing through the ports 32 from the chamber 44 to the chamber 45. This insulating and sealing compound may be any suitable molten or plastic material which will set or harden after pouring sufficiently to fix the sheath and conductors rigidly in the housing.

The method of and the steps required for installing this cable seal will be evident to those skilled in this art from the drawings and foregoing description.

It will be apparent that the above described cable seal can readily be adapted for sealing cable means comprising any size of cable units or conductors. It will also be clear that the construction described may be adapted for sealing an outlet where more than one cable is carried in a conduit by providing an inner partition and spiders formed with a plurality of openings. It will also be evident that this device is adapted to seal a single or a pair of conductors or any number of conductors extending outwardly from the sheath by providing an outer partition having the required number of apertures.

Referring now to the adaptation of this invention used in an inverted position as illustrated in Figures 14 to 22 inclusive, the conduit to which this adaptation is applied is indicated at 50. This conduit is shown with its axis disposed vertically and with its open end directed downwardly. For purposes of illustrating the adaptability of this improved cable seal, three sheathed cables or cable units 51 are illustrated as comprising the cable means in this adaptation of the invention, in place of the single cable unit illustrated in the first described form. Each cable or cable unit comprises a lead sheath 52 and, in the embodiment illustrated, only one insulated conductor 53 is shown enclosed in each cable. Each of the sheaths extends a substantial distance beyond the end of the conduit, and the conductors extend beyond the end of the sheath sufficiently to permit the connection of these conductors to the apparatus to which the electrical current is intended to be carried.

Each sheath, at its outer end, is preferably formed during the installation of the cable seal with a flange 54. This cable seal is mounted upon the lower end of the conduit 50 and forms a housing indicated generally at 55. As in the previously described form, this housing consists of three separate body elements, the inner casing 7, an extension casing 8, and an outer end or bushing member 9, these parts being substantially identical in form and composition with the similarly numbered parts illustrated and described in connection with Figures 1 to 8, and similar reference characters have been applied to the various portions of these parts in Figures 14 to 17.

In view of the inverted mounting of this adaptation of the cable seal, it is possible to dispense with the partition 12 and the casing 7 is accordingly screwed upon the lower end of the conduit 50 until the annular shoulder 11 on the casing 7 abuts the lower end of the conduit.

As will be understood, if a single cable or cable unit were to be sealed in the adaptation illustrated in Fig. 14, spiders substantially identical with the spiders 19 and 28 could be interposed between the inner casing 7 and the extension casing 8. Due to the necessity of providing for a larger number of sheathed cables however, in the device illustrated in Fig. 14, it becomes necessary to substitute spiders formed with a number of apertures corresponding to the number of cables and such a spider is illustrated at 56, this spider engaging the outer face 18 of the inner casing 7 and is preferably secured to this inner casing 7 by means of a plurality of counter sunk screws 20', 20', passing through ears 21', 21' formed on diametrically opposed sides of the spider 56 and engaging suitably tapped holes in the bosses 22.

This spider is formed, in the embodiment illustrated, with three openings 57 of substantially the same size as the outside diameter of the sheaths 52 of the cable 51. As will be understood, in assembling, the spider 56 is slipped over the sheaths 52, permitting sufficient material of each sheath to extend outwardly beyond the spider to permit the formation of the flange 54 of the desired size against the outer surface 58 of the spider.

The spider 56 is further formed with laterally extending ears 25', longitudinally extending flanges 26' and recesses 27' similar to those provided on the spider 19.

Engaging the outer faces of the flanges 54 is a second spider 59 formed with a plurality of openings 60 of substantially the same size as the openings 57 and formed with an inner surface 61 adapted to engage the outer faces of the flanges 54. The spider 59 is also formed with radially projecting ears 31', 31', adapted to be nested in and centered by the recesses 27', 27' on the ears 25' formed on the spider 56, whereby the spiders are interlocked to prevent relative lateral shifting while permitting axial movement.

The several parts of these spiders are dimensioned and function in a manner identical with that disclosed in the description of the device in Fig. 1. Longitudinal ports 62 similar to the ports 32 are formed between the outer dimensions of the surfaces 58 and 61 and the inner dimensions of the casings 7 and 8.

The lower or outer composite sealing closure member 39 illustrated in Fig. 14 is substantially identical with the same element illustrated and described in connection with Fig. 1 and similar reference characters have been applied to the component parts of this outer seal. As will be understood, this seal is assembled and functions in substantially the same manner as the previously described closure.

It will appear from the drawings that in the adaptation of this device illustrated in Fig. 14, a chamber is formed within the housing 55 and this chamber also consists, in fact, of two axially alined spaced chambers, an inner or upper chamber 63 and a lower or outer chamber 64, the chamber 63 being formed around the sheathed portions of the cable extending outwardly from the conduit and the chamber 64 being formed around a portion of the conductors 53 extending outwardly beyond the outer end of the sheath. The ports 62 at the flange clamping spiders form connecting passages between the chambers 63 and 64.

For the purposes of effectively sealing and insulating and mechanically anchoring the sheaths and conductors, a suitable sealing compound is introduced into the chamber 63 through the opening 46 formed in the casing 7, this sealing compound readily passing downwardly through the ports 62 to fill the chamber 64. Sufficient sealing compound is introduced into the chamber 63 to bring the upper level of this compound a sufficient distance above the clamping spiders to firmly grip and seal the sheaths of the cables. It will be apparent that, in the adaptation just described, no sealing diaphragm is necessary at the lower end of the conduit to prevent the escape of molten sealing compound.

Referring now to the adaptation of this invention used in an upright position as illustrated in Figures 23 to 26 inclusive, the conduit to which this cable seal is applied is indicated at 70. This conduit is shown with its axis disposed vertically and with its open end directed upwardly. This cable seal is illustrated as applied to an electric cable means including a relatively larger cable or cable unit and the several parts of the seal are correspondingly enlarged. As illustrated, the conduit 70 encloses a sheathed cable or cable unit 71 comprising a lead sheath 72 and in the embodiment illustrated, three conductors, 73, each covered by suitable insulation. The sheath projects outwardly beyond the end of the conduit a proportionate distance somewhat less than that disclosed in previously described adaptations but still sufficient to effectively seal the sheath in the sealing compound. The conductors 73, of course, project outwardly beyond the end of the sheath and, in fact, beyond the end of the cable seal. The sheath, at its outer end, is preferably formed during the installation of the cable seal with a terminating flange 74. This cable seal is mounted upon the end of the conduit and consists of a housing indicated generally at 75 and comprises three main body forming members, an inner casing member 76, an extension casing 77, and an outer or ring bushing member 78, these elements being generally similar in form and composition with the corresponding parts in the previously described adaptations.

The inner casing member 76 is formed with an interiorly threaded hub 79 adapted to be screwed upon the threaded end of the conduit. Adjacent the threaded hub and juxtaposed to the end of the conduit, the casing 76 is formed with a shoulder 80. Interposed between the end of the conduit and the shoulder 80 is a metal clad sealing partition indicated generally at 81 and comprising a soft rubber diaphram 82 mounted between two relatively thin annular sheet metal rings 83 each having a flat portion cemented or otherwise suitably secured to the face of the rubber diaphram and being formed centrally with an opening bounded by an axially extending belled flange or pilot, the diameter of the opening being sufficiently large to accommodate the largest cable intended to be carried by the conduit. The rubber diaphram 82 is formed with an opening considerably smaller in area than the outside of the cable 71, in order that the rubber may snugly embrace the cable sheath 72 when the cable is inserted in the opening, and thus make a substantially liquid tight joint between the diaphram and the cable. The outer end of the casing 76 is formed with an external thread as indicated, and terminates in a substantially smooth outer face 84. Engaging the outer face 84 is a spider 85 preferably secured to the inner casing 76 by means of a plurality of screws 86 passing through ears 87 formed on diametrically opposite sides of the spider 85 and engaging suitably tapped holes in bosses formed in the casing 76, as indicated.

The spider 85 is formed with an opening 88 of a size to permit the snug passage therethrough of the sheath 72, this sheath being drawn outwardly beyond the spider a sufficient distance to provide material to form the flange 74 against the outer annular face 89 of the spider 85.

The spider 85 is further formed with laterally extending ears 90, longitudinally extending flanges 91 and interposed recesses 92 in substantially the same manner as in the previously described adaptations.

Engaging the outer surface of the flange 74 is a second spider 93 formed with an opening 94 of substantially the same size as the opening 88 and formed with an inner annular surface 95 engaging the outer face of the flange 74. The spider 93 is also formed with radially projecting ears 96 loosely nesting in and centered by the recesses 92 formed on the spider 85 by which the spiders are interlocked to prevent relative lateral and rotational shifting while permitting free axial movement. These spiders and associated parts function in exactly the same manner as in the previously described adaptations.

Longitudinal ports 97 similar to the ports 32 and 62 are formed between the outer dimensions of the surfaces 89 and 95 and the inner dimensions of the casings 76 and 77. The outer end of the extension casing is formed with an external thread and terminates in a substantially smooth face 98. In threaded engagement with the outer end of the extension casing is the outer ring member 78 which is formed with an inwardly directed annular shoulder or abutment 99. Interposed between the outer face 98 and the abutment 99 is a relatively rigid cover 100 formed of insulating material formed with suitable apertures to receive a plurality of tubular insulating extensions 101 in fluid tight relation. The number of apertures and tubular extensions preferably though not necessarily, correspond to the number of conductors whose egress is to be provided for. At the outer end of each of the tubular extensions, a suitably fluid tight joint 102 made of insulating tape or other suitable material is preferably applied to the conductors and tubular extension.

As will appear, a chamber is formed within the housing 75 and this chamber, as in the two previously described adaptations, consists of two axially alined spaced chambers, an inner or lower chamber 103 and an outer or upper chamber 104, the chamber 103 being formed around the sheathed cable and the chamber 104 being formed around a portion of the conductors 73 extending outwardly beyond the end of the sheath. These ports 97 at the flange clamping spiders form connecting passages between the chambers 103 and 104.

For the purpose of effectively sealing and insulating and mechanically anchoring the sheath and conductors, a molten sealing and insulating compound is introduced into the chamber 104 for which purposes a threaded opening 105 is formed in the cover 100, this opening being adapted to be closed by a threaded plug 106. The sealing compound readily passes downwardly through the ports 97 to fill the chamber 103. It will be apparent that in the adaptation just described, no yielding rubber sealing diaphram is necessary in the upper or outer end of the cable seal housing and that any suitable cover may be provided at this point.

Referring now to the modification of the inner seal construction illustrated in Figures 27 and 28, provided when the cable seal is used in the horizontal position, and when the cable means comprises a plurality of sheathed cable units or conductors to be sealed, instead of one sheathed cable or unit, as shown in Fig. 1.

In these figures the three sheathed cables 110 are carried in the conduit 1, each cable including a sheath 111 and a conductor 112. The inner casing 7 is screw threaded upon the end of the conduit and is formed with an annular shoulder or abutment juxtaposed to the end face of the conduit. Interposed between the abutment and the end of the conduit is a composite sealing diaphram or partition indicated generally at 113 and formed of an elastic and relatively soft rubber diaphram 114 mounted between two relatively thin annular sheet metal rings 14, each having a flat portion 15 preferably cemented or otherwise suitably secured to the face of the rubber diaphram and formed with an opening bounded by an axially extending and radially outwardly belled flange or pilot 16, the diameter of this opening being sufficiently large to accommodate the aggregate of the largest cables intended to be carried by the conduit.

The rubber diaphram 114 is formed with a plurality of apertures preferably equal in number to the number of cables to be sealed. The area of each of these apertures when its periphery is free or unextended, is in each case considerably smaller than the cross sectional area of the respective cable 110 for which the aperture is intended. Accordingly when the sheathed cable is inserted in the aperture, the rubber at and adjacent the periphery of the aperture snugly embraces the sheath in a substantially liquid tight manner. The belled flange or pilot 16 prevents injury to the surfaces of the sheaths when a cable is drawn through the conduit and through the rings 14.

While an individual aperture in the rubber diaphram is preferred for each of a plurality of conductors, both in the inner partition as well as in the outer closing partition, it is feasible to form a single irregularly shaped aperture in the diaphram generally conforming to the outer configuration of the cables intended to be sealed.

In reference to the inner and outer partitions for sealing the cables and conductors, altho a relatively soft elastic rubber is preferred, for the sealing diaphragm, it will be understood that any of the well known synthetic materials may be substituted for the usual rubber; in fact, any relatively soft and yielding material may be used for the diaphram without departing from the scope of this invention, so long as it possesses the properties required to enable the material to temporarily seal the conductors or sheaths in sufficiently liquid tight manner to substantially prevent the molten sealing compound from escaping before it congeals.

It is noted that the embodiments illustrated and described disclose this cable seal applied to constructions in which the conduit carries one sheathed cable in some forms and three sheathed cables in other forms. It will be evident that this cable seal may be adapted to seal any number or size of sheathed cables carried by and extending outwardly from the conduits, by providing an inner partition and spiders formed with a corresponding number and size of apertures.

It is further noted that while for purposes of illustration the disclosed forms of these devices are adapted to seal three outwardly extending conductors, it will also be evident that this cable seal may readily be adapted to seal any number or size of conductors extending outwardly from one or any number of sheaths by providing an outer closure member formed with a suitable number of openings of satisfactory size and contour.

Accordingly, altho the specifications disclose only a limited number of sheathed cable and conductor arrangements and altho the claims in most instances define the construction with reference to one sheathed cable and conductor, it is pointed out that no unnecessary limitations should be understood therefrom and that the scope of the invention as defined in the claims embraces the use of any form of this device for sealing one or any number of sheathed cables or conductors. Accordingly in the appended claims the expression "cable means" is used to denominate a single cable unit 2, 51 or 71, or a plurality of them. The term "cable means" may therefor include one or any number of units, and each unit may include one or more conductors, and therefor in order to clearly set forth the scope of this invention in respect to the number of cable units and conductors sealed, the expressions "at least one unit" and "at least one conductor" are employed in the claims.

Many other modifications of this invention, in its construction and its application, in addition to the forms shown, will naturally occur to those skilled in this art, and the present disclosures should therefor be considered as typical only and applicant desires not to be limited to the exact construction shown and described.

What I claim is:

1. A cable seal construction comprising a casing mounted upon the end of a conduit providing a chamber, electric cable means including at least one cable unit and sheath therefor projecting beyond the end of the conduit and enclosed at least in part in the chamber, a radially flared flange formed on the sheath of the cable unit, a spider fixed against rotation relatively to the casing and formed with a surface adapted to engage the inner face of the flange, a second spider axially movable but rotatably fixed relatively to the first named spider and formed with a surface adapted to engage the outer face of the flange on the sheath, and means adapted to force the said surfaces into clamping engagement with the flange, said means including an annular member having screw-threaded engagement with the outer end of the casing and formed with an annular abutment adapted to force said second spider toward said first named spider when said member is threaded into place on the casing.

2. In a device for sealing electric cable means extending outwardly from the end of a conduit including at least one cable unit and sheath therefor, in combination a casing mounted upon the end of the conduit providing a chamber adapted to enclose the outwardly extending cable means, a transverse member removably mounted upon the outer end of the casing and formed with an aperture for the cable unit, a radially flared terminal flange formed on the sheath of the cable unit, said transverse member being spaced from the end of the conduit and formed with a surface adapted to engage the inner face of the flange, a second transverse member formed with a surface adapted to engage the outer face of the flange, at least one of said transverse members being locked against rotation relative to the casing, and screw means adapted to force said surfaces into clamping engagement with the interposed flange, said screw means comprising an annular member having screw threaded engagement with the outer end of the casing.

3. In a device for sealing electric cable means including at least one cable unit extending outwardly from the end of a conduit, the combination of a casing mounted upon the end of the conduit, the said unit extending into the casing, an abutment formed on the casing and juxtaposed to the end of the conduit, a sealing partition interposed between the end of the conduit and the abutment, the partition including a diaphragm made of relatively yielding material having an aperture for embracing the unit in substantially liquid tight relation, and relatively rigid annular members engaging peripheral portions of the diaphragm, at least one of said members being formed with an axially directed and radially outwardly belled guide surrounding the aperture.

4. A device for sealing electric cable means including at least one sheathed cable unit extending outwardly from a conduit, and at least one conductor extending outwardly from the sheathed cable unit, comprising an inner casing mounted at its inner end upon the conduit, an extension casing mounted upon the outer end of the inner casing, a ring bushing mounted upon the outer end of the extension casing, the said unit and a sheath therefor extending into the inner casing from the conduit, an elastic rubber diaphragm interposed between the end of the conduit and the inner casing having an aperture for resiliently embracing the sheathed cable unit, opposed shoulder means interposed between the inner casing and the extension casing engaging the sheath in clamping relation, at least one conductor extending outwardly from the cable unit and thru the ring bushing, and a second elastic rubber diaphragm interposed between the extension casing and the ring bushing having an aperture for resiliently embracing the conductor.

5. A device for sealing electric cable means comprising an inner casing mounted at its inner end upon a conduit, an extension casing mounted upon the outer end of the inner casing, a ring bushing mounted upon the outer end of the extension casing, electric cable means comprising at least one cable unit and sheath extending into the inner casing from the conduit, a partition interposed between the end of the conduit and the inner casing having an aperture for embracing the sheathed cable unit in liquid tight relation, a radially outwardly extending flange formed on the sheath, opposed shoulder means spaced from the partition and interposed between the inner casing and the extension casing and clamping the flange, at least one conductor extending from the cable unit thru the extension casing and ring bushing, and a second partition interposed between the extension casing and the ring bushing having an aperture for embracing the conductor in liquid tight relation.

6. A sealing structure for sealing electric cable means including at least one cable unit extending outwardly from a conduit, a sheath for the unit and at least one conductor extending outwardly from the unit beyond the end of the sheath, said structure comprising an inner casing mounted at its inner end upon the conduit and enclosing and forming an inner chamber around the outwardly extending sheathed cable unit, an extension casing mounted upon the outer end of the inner casing and enclosing and forming an outer chamber around a portion of the outwardly extending conductor, a ring bushing mounted upon the outer end of the extension casing, a partition interposed between the end of the conduit and the inner casing having an aperture for embracing the said unit in substantially liquid tight relation, whereby the inner chamber is sealed from the conduit, a pair of plates interposed between the inner casing and the extension casing, formed with opposed shoulders clamping a portion of the sheath and provided with an aperture establishing communication between the inner chamber and the outer chamber, and a second partition interposed between the extension casing and the ring bushing having an aperture for embracing the conductor in substantially liquid tight relation, whereby the outer chamber is externally sealed, and at least one of said casings being provided with a filling opening adapted to receive molten sealing compound.

7. In a device for sealing electric cable means including at least one cable unit and a sheath for the unit extending outwardly from a conduit, in combination, a housing removably mounted at its inner end on the conduit, said cable means extending outwardly from the conduit and partly thru the housing, and at least one conductor extending outwardly from the unit beyond the end of the sheath and beyond the outer end of the housing, the housing being formed with a chamber and provided at its outer end with a closure formed with an opening for the conductor and provided with sealing means engaging the conductor in substantially liquid tight relation, the housing being formed with an inner abutment means juxtaposed to the end of the conduit, a removable inner closure member interposed between the abutment means and the end of the conduit and spaced inwardly from the end of the sheath, the inner closure member including an elastic rubber diaphragm having an aperture for embracing the unit, the normal area of the aperture being smaller than the cross-sectional area of the unit therein, whereby the cable means is yieldingly embraced by the rubber diaphragm in substantially liquid tight relation, and clamping means interposed between and spaced from said inner and outer closures adapted to fix the end of the sheath relatively to the housing.

8. An electric cable seal construction comprising a casing mounted upon the end of a conduit providing a chamber, cable means including at least one cable unit and sheath therefor projecting beyond the end of the conduit and enclosed in the chamber, a radially flared flange formed on the sheath within the casing, a spider removably fixed to the casing and formed with a surface adapted to engage the inner face of the flange, a second spider formed with a surface adapted to engage the outer face of the flange, said spiders being formed with interengaging shoulder means preventing relative rotation between said spiders when the spiders are in the flange engaging positions, and means adapted to force the said surfaces into clamping engagement with the flange, said means including an annular member having a screw threaded engagement with the outer end of the casing and formed with an annular abutment adapted to force said second named spider toward said first named spider when said member is threaded into place on said casing.

HERMAN A. TEPEL.